US012220029B2

(12) United States Patent
Abulayla

(10) Patent No.: US 12,220,029 B2
(45) Date of Patent: Feb. 11, 2025

(54) FINGER RING ROSARY PRAYERS COUNTING DEVICE

(71) Applicant: Majdy Saadi Abulayla, Sylvania, OH (US)

(72) Inventor: Majdy Saadi Abulayla, Sylvania, OH (US)

( * ) Notice: Subject to any disclaimer, the term of this patent is extended or adjusted under 35 U.S.C. 154(b) by 0 days.

(21) Appl. No.: 18/338,346

(22) Filed: Jun. 21, 2023

(65) Prior Publication Data

US 2024/0057731 A1 Feb. 22, 2024

Related U.S. Application Data

(60) Provisional application No. 63/367,617, filed on Jul. 3, 2022.

(51) Int. Cl.

*A44C 9/00* (2006.01)
*A47G 33/00* (2006.01)
*G06M 1/22* (2006.01)

(52) U.S. Cl.

CPC ............. *A44C 9/0053* (2013.01); *G06M 1/22* (2013.01)

(58) Field of Classification Search

CPC .......... A44C 9/0053; A44C 9/00; G06M 1/22; A47G 33/008
USPC .................................. 63/1.11, 1.12, 1.13, 15
See application file for complete search history.

(56) References Cited

U.S. PATENT DOCUMENTS

| | | | | |
|---|---|---|---|---|
| 1,324,524 | A | 12/1919 | Silver | |
| 2,213,516 | A | 9/1940 | Martin | |
| 5,063,285 | A | 11/1991 | Curry | |
| 6,065,971 | A | 5/2000 | Lennon | |
| 11,315,005 | B1 | 4/2022 | Habash | |
| 11,829,838 | B1 * | 11/2023 | LaRussa | A47G 33/008 |
| 2002/0142275 | A1 | 10/2002 | Wexler | |
| 2004/0190383 | A1 | 9/2004 | Marcucelli | |
| 2007/0292827 | A1 | 12/2007 | Forbath | |

FOREIGN PATENT DOCUMENTS

| | | | |
|---|---|---|---|
| CN | 201312715 | Y | 9/2009 |
| KR | 100940224 | B1 | 2/2010 |
| KR | 20110032387 | A | 3/2011 |
| KR | 101353430 | B1 | 1/2014 |
| WO | WO 2009144689 | A1 | 12/2009 |
| WO | WO 2017084475 | A1 | 5/2017 |

* cited by examiner

*Primary Examiner* — Jack W Lavinder

(57) ABSTRACT

A finger ring rosary prayers counting device enables the operator to see both the urged beads and the beads number count display area on the same eyes sight view with no need to twist his hand to see the number count. It includes a housing that contains a counter and a number count display area mounted on the stationary facing surface of the ring. A rotating member are attached to the stationary ring body that have a mounted bridges' elements that extend higher than the ring circumference where a plurality of beads is attached to the bridges' elements and positioned around the circumference of the ring. The finger ring rosary prayers counting device relates to the use for religious, entertaining, or athlete practices count and is desirable when the user is doing the catholic rosary or the Muslim prayer's tasbih repetition.

19 Claims, 7 Drawing Sheets

FINGER RING ROSARY PRAYERS COUNTING DEVICE

CROSS-REFERENCE TO RELATED APPLICATIONS

This application claims the benefit of U.S. Provisional Patent Application No. 63/367,617 filed on Jul. 3, 2022, and entitled “Finger Ring rosary Prayers Counting Device” which is hereby incorporated by reference for all purposes.

BACKGROUND OF THE INVENTION

1. Field of the Invention

The present invention is in the field of rosaries and more particular to beads counting device that is inserted on the user’s finger.

2. Description of Related Art

Many people of the Christian, Muslim, and Buddhist faith make daily habit of saying a set of prayers, which are repeated in a set of fashion where a count is essential to accomplish their need. Typically, the prayers are said with the aid of a set of beads known as rosary beads, consisting of beads affixed to a string. The Rosary beads is held by the persons hand and prayers are counted by passing the persons fingers along the beads.

Accordingly, the use of alternative counting devices to count prayers has become popular. In this regard, a variety of different counting devices, including modified rings, bracelets, handheld clickers, watch wrist bands, etc., have been developed to allow such persons to count prayers. Some of these devices are Finger Ring Counting Device patent number U.S. Pat. No. 6,065,971A, prayer counter patent number US20070292827A1, Electric Rosary patent number CN201312715Y, and a portable digital bead counter of Buddhist rosary patent number KR20110032387A.

SUMMARY OF THE INVENTION

It is a major object of the present invention to provide an improved lightweight, portable finger ring rosary prayers counting device which meet the following need:

1 the provision to provide a finger ring rosary prayers counting device which is simple and easy to operate when held by a hand finger and operated with other fingers without the need to insert fingers into beads channels to be able to move beads;

2 the provision to provide a finger ring rosary prayers counting device which can conveniently be used to enables operator to accurately count prayers, Muslims tasbih count, mala count for Buddhist, or to keep track of a recitation count;

3 the provision of such modified ring which can be inconspicuously operated by user;

4 the provision of a modified ring device including a plurality of beads elevated from the stationary ring body and inserted on bridge element that extends over the circumference of the stationary ring body to easily control each bead movement by the hand finger rather than a push button devices;

5 the provision of sitting the beads window’s number count display to enable the user to see the rotating beads and the beads number count on the same eyes sight view without the need to bend the hand to see the displayed number count;

6 Other objects, features and advantages of the invention shall become apparent as the description thereof proceeds when considered in connection with the accompanying illustrative drawings.

DETAILED DESCRIPTION

Figure 1:
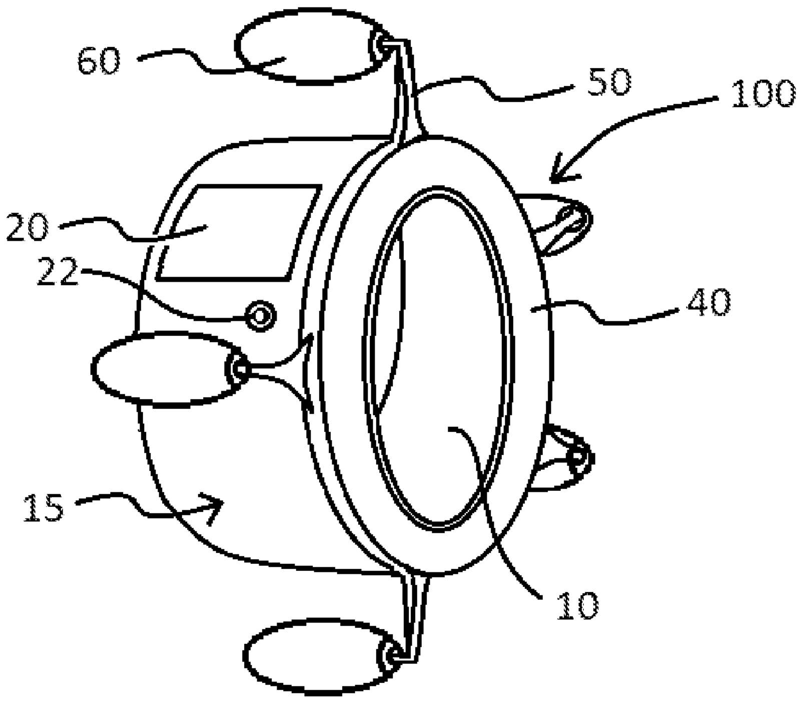
FIG. 1 is a perspective view of a finger ring rosary prayers counting device according to an embodiment of the present invention.

1 The inventor provides a finger ring rosary prayers counting device that enable person to easily rotate bead members and see the beads number count on the same eyes sight view without the need to bend the user’s hand. The present invention is described in enabling detail in the following examples, which may represent more than one embodiment of the present invention.

2 Referring now to the drawing of a preferred embodiment of the improved device as will hereinafter be more fully described Finger Ring Rosary Prayers Counting Device 100 illustrated and generally indicated and shown in FIGS. 1-11.

3 FIG. 1 is a perspective view of a finger ring rosary prayers counting device 100 according to an embodiment of the present invention. Finger ring rosary prayers counting device 100 in this example has a finger ring stationary body 15 in a shape of a cylinder which have a plurality of cavity, a central cavity 5 shown in FIG. 2, where the operator’s any hand finger may be inserted. An additional cavity 7 shown in FIG. 4, for housing a counter 25. In this view a number count display area 20 is located into the outer circumference 17 shown in FIG. 2, of the finger ring stationary body 15 wherein the a display element such as light-emitting diode display (LED), liquid crystal display (LCD), rigid material display, numbers marked on a plastic cylinder, or other types of number count display output from the counting device 25 is located within or seen through it. In this example a polarity of a rotating member 40 has a cylindrical shape having a central cavity which are vertically attached to plural side of the finger ring stationary body 15 or to a plural side of the number count display area 20. In this view a plurality of a bridge element 50 attached to the rotating members 40 and extend over the finger ring stationary body 15 outer circumference 17. The bridge element 50 may be attached from one side as partial shown in FIG. 1 or may attach from two sides as a complete bridge element 57 shown in FIG. 10. Said bridge elements 50 may have a geometrical shape for a part or for a whole, other than the shown exemplary shape of an embodiment of the present invention, it may also take a combination of geometrical shapes for the rising parts and the horizontal parts of the bridge element 50 areas, however, other architectural arrangements are known to the inventor. In this example a plurality of beads 60 supported by the bridge element 50, which are attached to the bridges element 50 by either being inserted or affixed to the bridge element horizontal part 55 shown in FIG. 6. In this view a reset button 22 is located at the finger ring stationary body 15.

Figure 2:
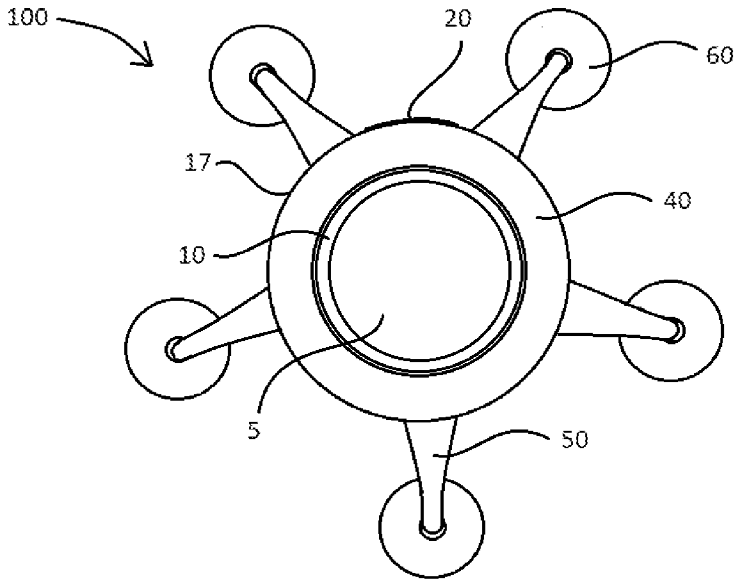
FIG. 2 is a side view of the finger ring rosary prayers counting device of FIG. 1.

4 FIG. 2 is a side view of the finger ring rosary prayers counting device 100 of FIG. 1 according to an embodiment of the present invention. It includes many of the same components introduced in FIG. 1 above. Those components that are unchanged in this embodiment retain their original element numbers and are not reintroduced. In this view a central cavity 5 shown, where the operator's any hand finger may be inserted. In this example an interior fitting area 10 is shown, this area is a part of the finger ring stationary body 15 and it also shown in FIG. 6 this area may curved to smoothen the hand finger inserting.

Figure 3:
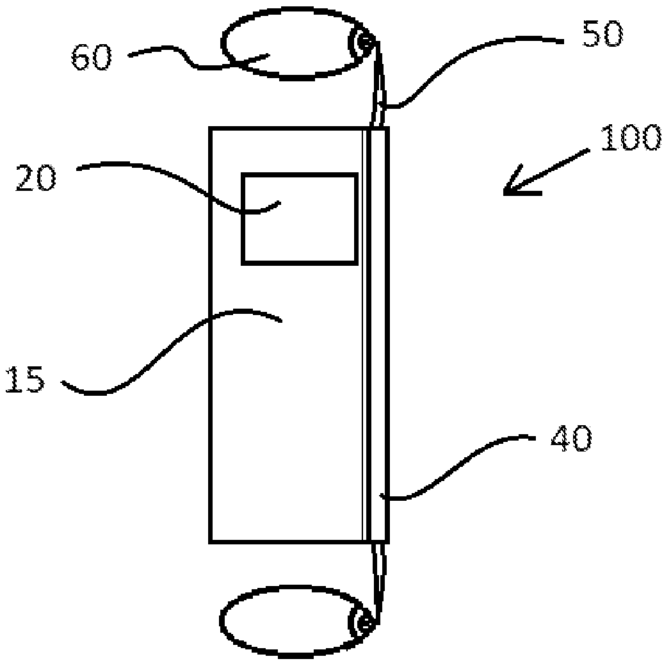
FIG. 3 is a top view of the finger ring rosary prayers counting device of FIG. 1.

5 FIG. 3 is a top view of the finger ring rosary prayers counting device 100 of FIG. 1 in one embodiment of the present invention. In this example the beads 60 are raised from the finger ring stationary body 15 and located above the finger ring stationary body 15 outer circumference 17. In this view said beads 60 mounted on the bridge element 50 where the user's finger can easily urge and rotate. The beads 60 can be urged without the extra effort of pushing, pressing, or inserting of the user's hand finger. In this example the number count display area 20 is clearly visible when the beads 60 rotate and no need to turn or twisting the user's hand. The number count increment occurs when the hand finger urges the bead 60 or when beads passing the number count display area 20 this increment will cause the counter 25 to increase by one number count.

Figure 4:
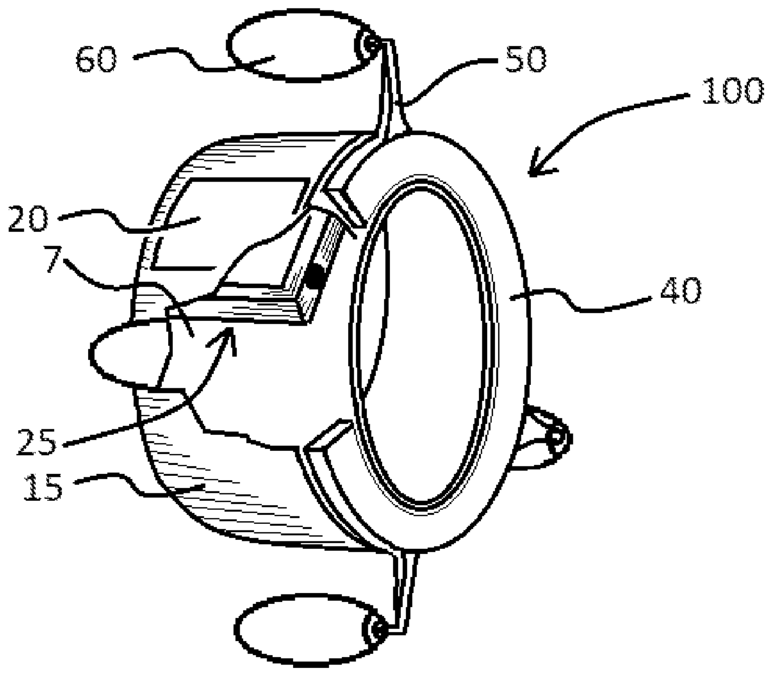
FIG. 4 is a sectional view of the finger ring rosary prayers counting device of FIG. 1.

6 FIG. 4 is a sectional view of the finger ring rosary prayers counting device 100 wherein a counter deposed in an interior hallow area 7 in one embodiment of the present invention, in this example a counting device 25 either digital, mechanical, or other like type counter deposed into the interior cavity of the finger ring stationary body 15.

Figure 5:
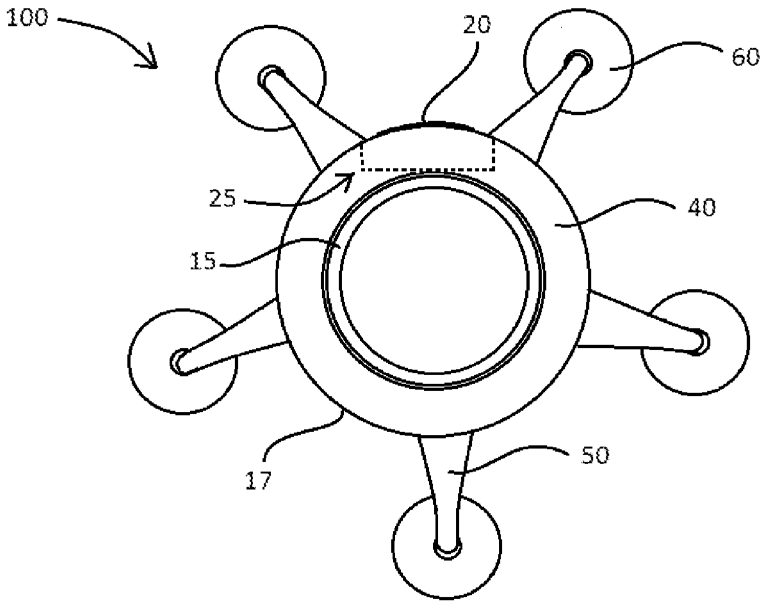
FIG. 5 is another side view of the finger ring rosary prayers counting device of FIG. 1.

7 FIG. 5 is another side view of the finger ring rosary prayers counting device 100 of FIG. 1 in one embodiment of the present invention. In this view a digital counter 25 is embedded into the finger ring stationary body 15.

Figure 6:
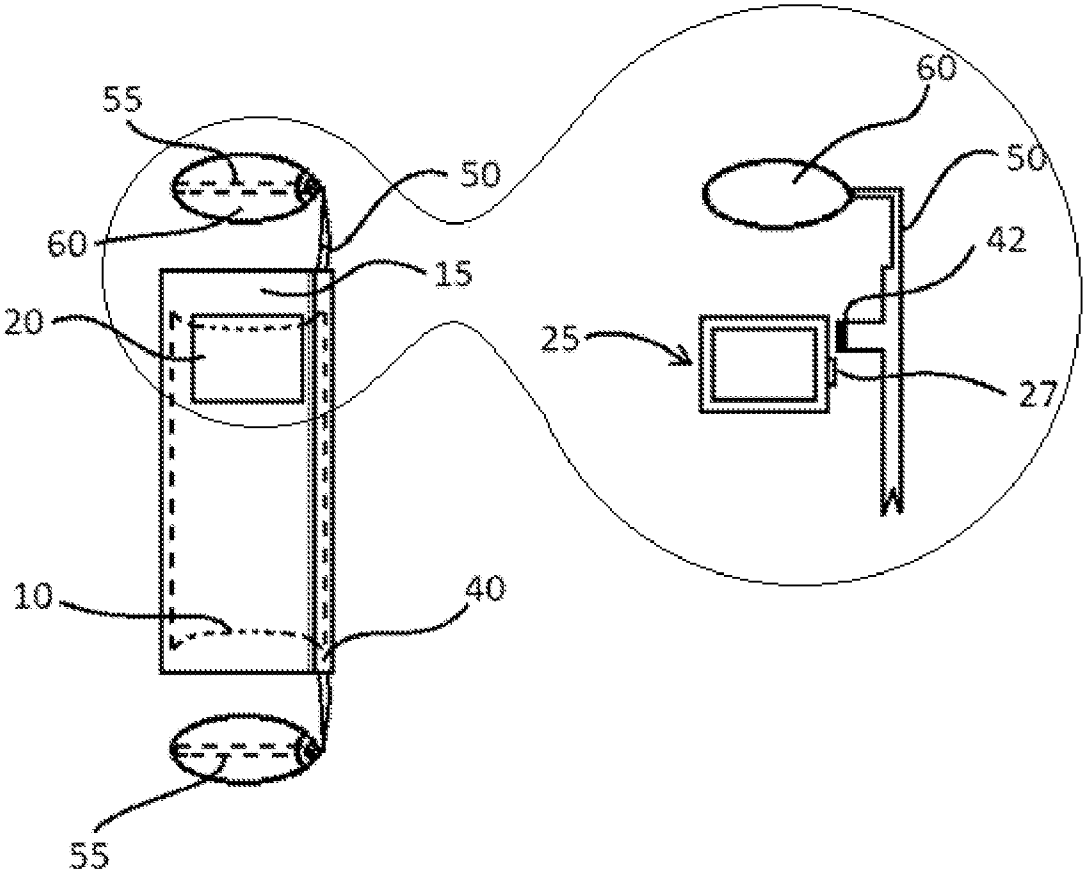
FIG. 6 is another top view of the finger ring rosary prayers counting device of FIG. 1.

8 FIG. 6 is another top view of the finger ring rosary prayers counting device 100 of FIG. 4, in one embodiment of the present invention. In this view the rotating members 40 interact with the counter 25 wherein a pusher such as a pin, teeth, button, or other like member 42 movement captured by a counter input 27 such as such as a sensor, a button, or any other like input.

Figure 7:
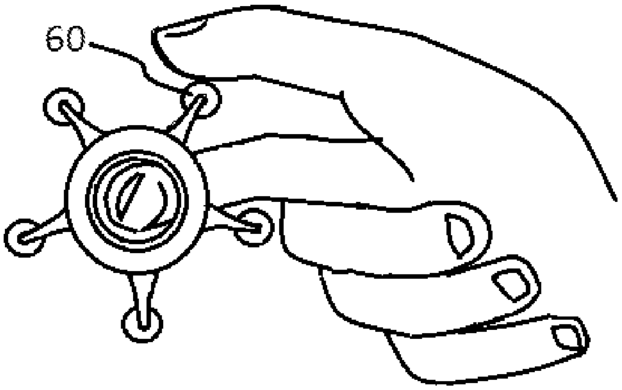
FIG. 7 is perspective side view of the finger ring rosary prayers counting device of FIG. 1, showing the present invention in use by an operator’s hand finger.

9 FIG. 7 is perspective side view of one embodiment of the present invention when in operation showing the urged bead 60 by a hand finger.

10 In this example each rotating bead 60 being moved passes around the number count display area 20 where it increment the counter 25 on the bead movement 60. The operator can either resetting the counter 25 to its starting status or continue counting the beads 60 by continuing the precedent counting session. In this example the bridge elements 50 and the rotating members 40 move simultaneously while advancing the urged beads 60, where the counter input 27 captures this movement. when the user completes a bead circle and the starting bead 60 return to its starting location, the counter 25 will continue adding or incrementing the bead count to the current accumulated count and keep displaying a new number count in the number count display area 20.

Figure 8:
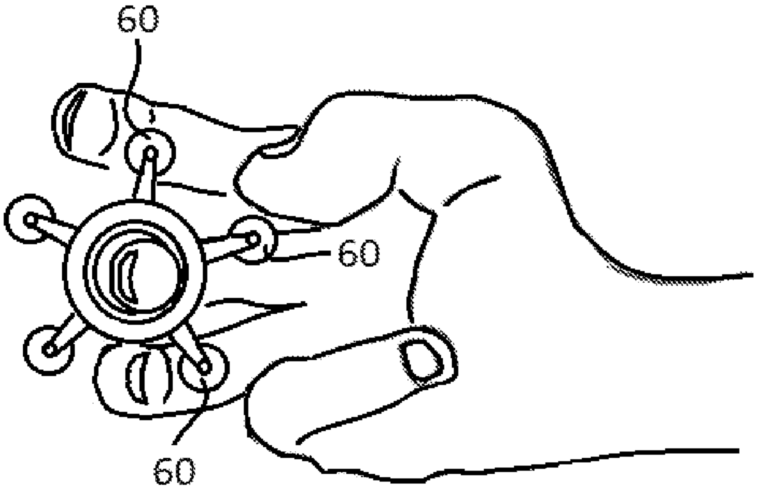
FIG. 8 is another perspective side view of the finger ring rosary prayers counting device of FIG. 1, showing the user advancement of plural beads with plural hand fingers.

11 FIG. 8 is another perspective side view of one embodiment of the present invention in operation showing of further bead advancement where the user manually urges plural beads 60, such as by the use of plural hand fingers such as the thumb and other fingers.

Figure 9:
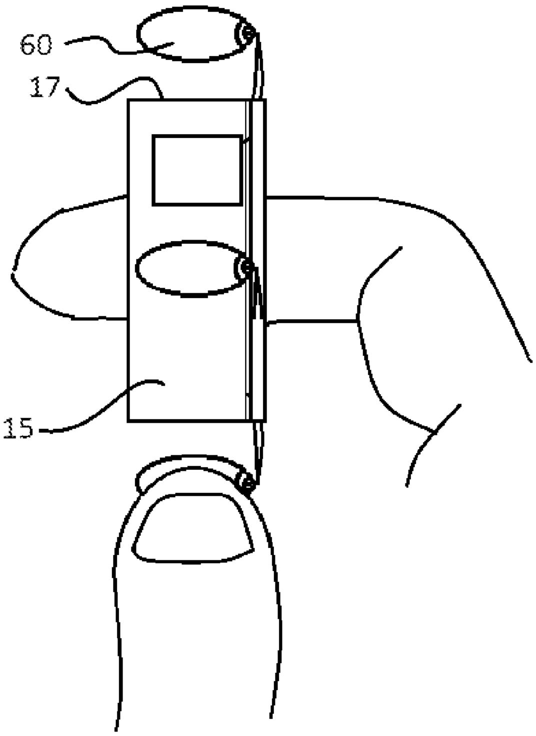
FIG. 9 is another perspective top view of the finger ring prayers counting device of FIG. 1, showing the attachments of the present invention and the urged beads by the user’s hand finger.

12 FIG. 9 is yet another perspective top view of one embodiment of the present invention showing the attachments of the present invention where the rotating beads 60 pass over the number count display area 20 by the user's hand finger. In this example the advancement of one rotating bead 60 by the hand finger represents one count. In this view the number count display area 20 is aligned vertically with the rotating beads 60 where both are viewed by the user while rotating the beads 60, on the same user's eyes sight without accommodation or changing user's hand direction such as twisting or bending.

Figure 10:
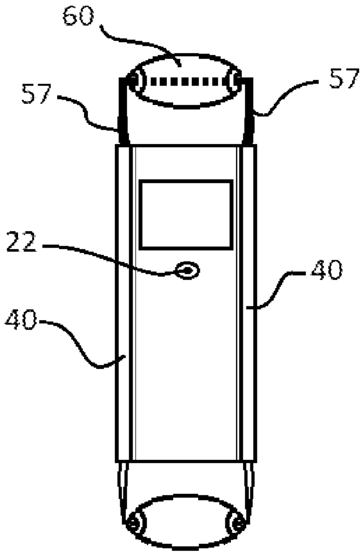
FIG. 10 is yet another perspective top view showing attachments of the finger ring rosary prayers counting device according to another embodiment of the present invention.

13 FIG. 10 is a perspective top view showing attachments of the finger ring rosary prayers counting device 100 according to another embodiment of the present invention. In this example a double rotating member 40 are attached to a plural sides of the finger ring stationary body 15 with the complete bridge element 57 affixed or attached to the plural rotating members 40 where the beads 60 are affixed or inserted into the horizontal part of the complete bridge element 57.

Figure 11:
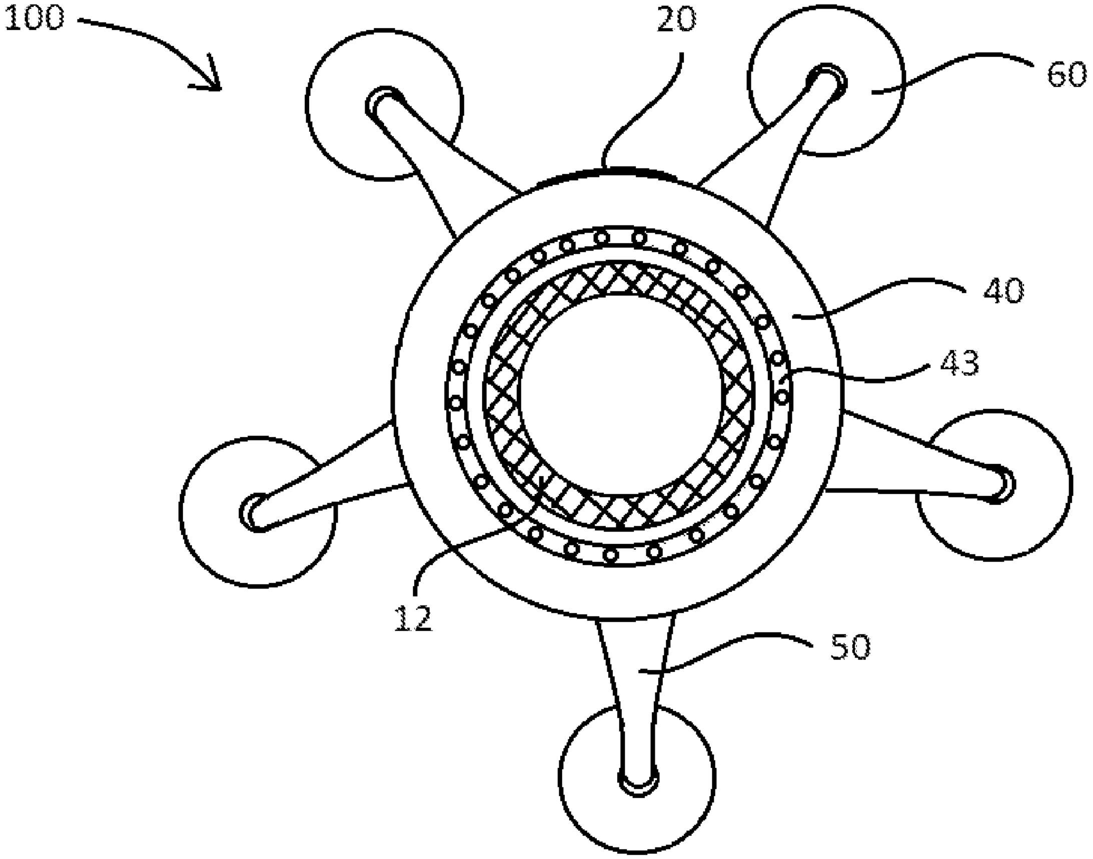
FIG. 11 is yet another perspective side view of a finger ring rosary prayers counting device according to another embodiment of the present invention.

14 FIG. 11 is another prospective side view showing another embodiment of the present invention in this example the rotating members 40 disposed on a sliding mechanism 43. In this view the central cavity 5 uses a fitting 12 from a soft material to smoothen the insertion of the hand finger or to ease the tightness when carried on.

15 According to another embodiment of the present invention, the finger ring rosary prayers counting device 100, the finger ring stationary body 15 can take a different shape other than circular, cylindrical, and a ring shape. The beads 60 shape can take a different shape other than the oval, cylindrical, spherical, cubical, triangular shape, or the horizontal curved shape of the mounted bridges 55. A clicking sound, a recitation recorded voice, or lights can be embedded as an addition to show the beads 60 movement, a number count increment, a number change, a recitation repetition, or as a reminder.

16 It is also to be understood that the respective elements of the present invention have been indicated as being molded or fabricated from plastic, metal, a mix, or could be easily formed from any other suitable material.

17 It will be apparent to one with skill in the art that the finger ring rosary prayers counting device of the present invention may be provided using some or all the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

Terminology Used Here

The bridge element rising part: The bridge element extended part regardless of its rising angle that starts from an element that supports it and exceeds the finger ring stationary body outer circumference.

The bridge element horizontal part: A part of the bridge element and is the continuation of the bridge element rising part it extends above the finger ring stationary body outer circumference.

Partial Bridge Element: Is a bridge element that is supported from one end of the bridge element.

Complete bridge element: Is a bridge element that is supported by plural ends of the bridge element.

Device: The invention physical embodiment to aid in counting prayers.

Member/element: A portion of the device, such as the bridge element, rotating member, finger ring stationary body, bead, and other parts.

What is claimed:

1. A finger ring rosary prayers counting device to be held by an operator's finger which may be used for counting prayers, the finger ring rosary prayers counting device comprising:

a. a finger ring stationary body having a substantially cylindrical body shape, said finger ring stationary body defining a plurality of cavities wherein one of said plurality of cavities is a central cavity whereinto an operator's finger is inserted, and wherein said plurality of cavities at least one is an inner cavity;

b. a plurality of rotating members having a substantially cylindrical shape attached horizontally to the finger ring stationary body wherein each of said plurality of rotating members defines a second central cavity;

c. a number count display area on an outer circumference of the finger ring stationary body wherein said number count display area is rectangular, square or any other shape;

d. a plurality of bridge elements affixed vertically to at least one of the plurality of rotating members and extends outwardly from the outer circumference of the finger ring stationary body;

e. a counter disposed within said inner cavity of the finger ring stationary body, wherein said counter is digital or mechanical.

2. The finger ring rosary prayers counting device according to claim 1 wherein said counter is adjacent to the plurality of rotating members.

3. The finger ring rosary prayers counting device according to claim 2 wherein said counter comprising:

a. an input to capture a passing element;

b. a reset button, wherein said reset button found on the finger ring stationary body;

c. a number count output wherein said number count output can be viewed from the number count display area.

4. The finger ring rosary prayers counting device according to claim 3 wherein said number count output is aligned with the number count display area.

5. The finger ring rosary prayers counting device as recited in claim 1 further comprising a plurality of beads wherein said plurality of beads are spherical, cylindrical, or any other geometrical shape.

6. The finger ring rosary prayers counting device according to claim 5 wherein said plurality of beads rotate above and about the outer circumference of the finger ring stationary body.

7. The finger ring rosary prayers counting device according to claim 6 wherein said plurality of beads rotate above the outer circumference of the finger ring stationary body.

8. The finger ring rosary prayers counting device according to claim 7 wherein said plurality of beads are disposed on said plurality of bridge elements.

9. The finger ring rosary prayers counting device according to claim 8 wherein each of said plurality of bridge elements rotatably mount one of said plurality of beads.

10. The finger ring rosary prayers counting device according to claim 7, wherein said plurality of beads and said plurality of bridge elements rotate in unison with said plurality of rotating members about the finger ring stationary body.

11. The finger ring rosary prayers counting device according to claim 7, wherein rotation of the plurality of beads about the finger ring stationary body advances the counter.

12. The finger ring rosary prayers counting device according to claim 1, wherein each of said plurality of bridge elements are connected to said plurality of rotating members.

13. The finger ring rosary prayers counting device according to claim 12, wherein each of said plurality of bridge elements comprise at least one element, radially and outwardly extending from an outer circumference of at least one of the plurality of rotating members, and a second element extending substantially perpendicular to the at least one element and located above the outer circumference of the finger ring stationary body.

14. The finger ring rosary prayers counting device according to claim 13, wherein each of the plurality of bridge elements rotate above and about the outer circumference of the finger ring stationary body.

15. The finger ring rosary prayers counting device according to claim 14, wherein each of said plurality of bridge elements advances the counter by one increment as it rotates past the counter.

16. The finger ring rosary prayers counting device according to claim 15, wherein said plurality of bridge elements are attached to the outer circumference of the plurality of rotating members.

17. The finger ring rosary prayers counting device according to claim 1, wherein said plurality of rotating members are disposed on and about the finger ring stationary body or disposed on and about a sliding mechanism on and about said finger ring stationary body.

18. The finger ring rosary prayers counting device according to claim 1 wherein the finger ring stationary body, the plurality of rotating members, and the plurality of bridge elements are formed from plastic, metal, or a combination thereof.

19. The finger ring rosary prayers counting device according to claim 1, wherein said number count display area is located on the outer circumference of the finger ring stationary body.

* * * * *